(12) United States Patent
Kiyosumi

(10) Patent No.: US 8,011,657 B2
(45) Date of Patent: Sep. 6, 2011

(54) SHEET TRANSPORT DEVICE AND IMAGE FORMING APPARATUS EMPLOYING THE SAME

(75) Inventor: Tadahiro Kiyosumi, Osaka (JP)

(73) Assignee: Kyocera Mita Corporation (JP)

( * ) Notice: Subject to any disclaimer, the term of this patent is extended or adjusted under 35 U.S.C. 154(b) by 121 days.

(21) Appl. No.: 12/509,520

(22) Filed: Jul. 27, 2009

(65) Prior Publication Data

US 2010/0019439 A1     Jan. 28, 2010

(30) Foreign Application Priority Data

Jul. 28, 2008  (JP) ................................ 2008-194019

(51) Int. Cl.
*B65H 7/02*  (2006.01)
(52) U.S. Cl. ....................................................... 271/265.01
(58) Field of Classification Search ............. 271/265.01, 271/265.02, 258.01, 110
See application file for complete search history.

(56) References Cited

U.S. PATENT DOCUMENTS

| | | | | |
|---|---|---|---|---|
| 6,152,631 | A * | 11/2000 | Park ................................ | 400/708 |
| 6,651,977 | B2 * | 11/2003 | Tanaka ........................... | 271/154 |
| 6,951,335 | B2 * | 10/2005 | Elgee et al. .................... | 271/264 |
| 7,182,336 | B2 * | 2/2007 | Fukushima et al. ..... | 271/265.01 |
| 7,188,837 | B2 * | 3/2007 | Bokelman et al. ....... | 271/265.01 |
| 7,404,558 | B2 * | 7/2008 | Kanome .................. | 271/258.05 |
| 7,567,762 | B2 * | 7/2009 | Ogihara et al. ................. | 399/18 |
| 7,593,683 | B2 * | 9/2009 | Kim et al. ..................... | 399/388 |
| 7,777,174 | B2 * | 8/2010 | Miwa ............................ | 250/221 |
| 2005/0189709 | A1 * | 9/2005 | Bokelman et al. ....... | 271/265.01 |
| 2006/0198669 | A1 * | 9/2006 | Ohba ............................ | 399/316 |
| 2007/0075484 | A1 * | 4/2007 | Terada ..................... | 271/258.01 |
| 2007/0284812 | A1 * | 12/2007 | Hirai ........................ | 271/265.01 |
| 2008/0309008 | A1 * | 12/2008 | Hamaguchi .............. | 271/265.01 |

FOREIGN PATENT DOCUMENTS

JP           2005-162342           6/2005

* cited by examiner

*Primary Examiner* — Kaitlin Joerger
(74) *Attorney, Agent, or Firm* — Gerald E. Hespos; Michael J. Porco

(57) ABSTRACT

A sheet transport device comprises a sheet feeding path through which a sheet is transported, first and second elements which are located face to face with a particular point in the sheet feeding path and have first and second surfaces, respectively, constituting part of the sheet feeding path and arranged therealong, an interposed element disposed insertably into and withdrawably from a space formed between the first and second elements, and a discharge arrester disposed in first and second surfaces for providing protection against a discharge of static electricity from the sheet, the discharge arrester having a projecting part extending in a direction intersecting the sheet feeding path.

15 Claims, 10 Drawing Sheets

SHEET TRANSPORT DEVICE AND IMAGE FORMING APPARATUS EMPLOYING THE SAME

BACKGROUND OF THE INVENTION

1. Field of the Invention

The present invention relates to a sheet transport device and an image forming apparatus.

2. Description of the Related Art

Typically, an image forming apparatus is provided with a sheet transport device for transporting sheets. The sheet transport device having a sensor for detecting whether each sheet has passed a particular point in a paper path. This sensor is a photointerrupter (hereinafter referred to as a PI sensor) including a light-emitting element and a light-sensitive element. The light-emitting element has a light-emitting surface from which light is emitted while the light-sensitive element has a light-receiving surface for sensing the light emitted from the light-emitting surface. The sensor further includes an interposed element which can be inserted into and withdrawn from a space formed between the light-emitting element and the light-sensitive element.

When a sheet passes the point in the paper path where the PI sensor is mounted, the sheet goes into contact with the interposed element, forcing the interposed element from within the space between the light-emitting element and the light-sensitive element to the outside of the space. More specifically, when forced by the sheet, the interposed element swings by a specific angle and moves from within the space between the light-emitting element and the light-sensitive element to the outside thereof. When moved to the outside of this space, the interposed element does not interrupt the light emitted from the light-emitting surface, whereby the PI sensor detects that the sheet has passed the particular point in the paper path.

If no sheet passes the point in the paper path where the PI sensor is mounted, the interposed element does not swing and thus remains in the space formed between the light-emitting element and the light-sensitive element. In this case, the interposed element interrupts the light emitted from the light-emitting surface, whereby the PI sensor detects that no sheet has passed the particular point in the paper path.

Since the sheet is transported along the paper path in sliding contact with various elements provided therearound, such as a transport roller or a transport guide plate, a static charge is accumulated in the sheet as a result of friction. If a discharge of the accumulated static charge occurs directly at the PI sensor, then a breakdown of a control board of the PI sensor, for example, may potentially occur.

One approach to the solution of this problem is shown in Japanese Unexamined Patent Publication No. 2005-162342, which proposes the provision of a grounding plate attached to a PI sensor for protecting the sensor from a discharge of static electricity. Specifically, the grounding plate described in this conventional approach is a flat-shaped plate fitted to a paper path close to a light-emitting element and a light-sensitive element of the PI sensor, the grounding plate being arranged to cover the entirety of surfaces of the light-emitting element and the light-sensitive element facing the paper path. With this arrangement, the static electricity is discharged to the grounding plate so that the PI sensor is protected from the discharge of the static electricity.

However, the aforementioned grounding plate is flat-shaped so that the grounding plate must have a larger surface area than a total area of the surfaces of the light-emitting element and the light-sensitive element facing the paper path in order to protect the PI sensor from the discharge of the static electricity. Considering, in particular, a mechanical error which occurs when the grounding plate is mounted to the PI sensor, it is necessary that the grounding plate have a large surface area.

In addition, since the grounding plate is flat-shaped, a discharge of static electricity which occurs from a sheet may not directly reach the grounding plate but the PI sensor, if the surface area of the grounding plate generally equals the total area of the surfaces of the light-emitting element and the light-sensitive element facing the paper path. This is another reason why the grounding plate must have a large surface area to ensure that the discharge of static electricity would easily reach the grounding plate.

If, however, the surface area of the grounding plate is so increased, the space between the light-emitting element and the light-sensitive element will be reduced. This would make it difficult to smoothly insert and withdraw the interposed element into and out of the space between the light-emitting element and the light-sensitive element and, as a consequence, it will be difficult that the PI sensor properly detects whether the sheet has passed the particular point in a paper path.

SUMMARY OF THE INVENTION

Accordingly, it is an object of the invention to provide a sheet transport device and an image forming apparatus which can properly protect internal elements from a discharge of static electricity and ensure proper operation of these elements.

A sheet transport device according to a first aspect of the invention intended to achieve the aforementioned object thereof comprises a sheet feeding path through which a sheet is transported, first and second elements which are located face to face with a particular point in the sheet feeding path and have first and second surfaces, respectively, constituting part of the sheet feeding path and arranged therealong, an interposed element disposed insertably into and withdrawably from a space formed between the first and second elements, and a discharge arrester disposed in first and second surfaces for providing protection against a discharge of static electricity from the sheet, wherein the discharge arrester has a projecting part extending in a direction intersecting the sheet feeding path.

These and other objects, features and advantages of the invention will become more apparent upon a reading of the following detailed description along with the accompanying drawings.

DETAILED DESCRIPTION OF THE PREFERRED EMBODIMENTS

A preferred embodiment of the present invention is now described with reference to the accompanying drawings.

Figure 1:
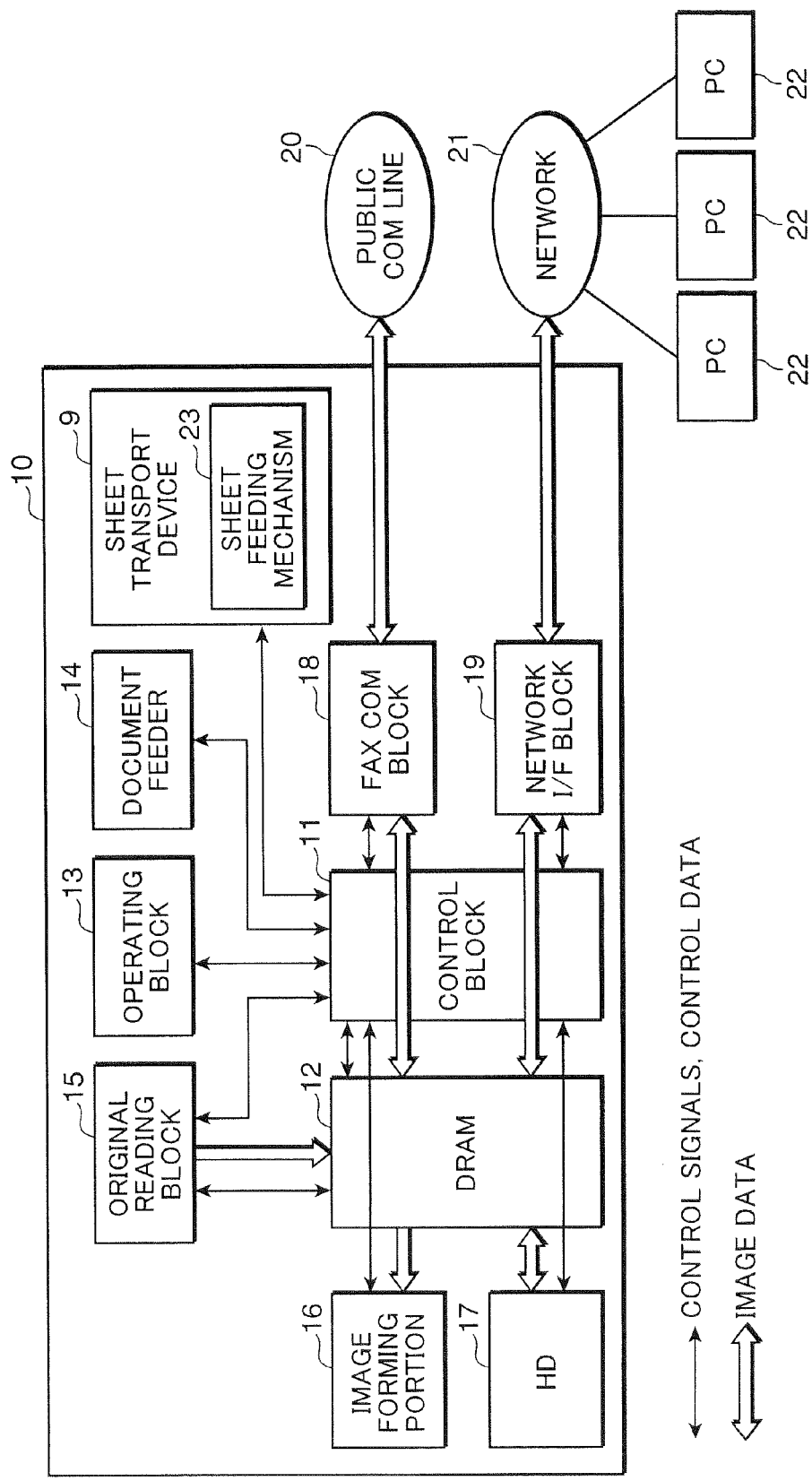
FIG. 1 is a block diagram showing the configuration of a digital hybrid machine which is an example of an image forming apparatus provided with a sheet transport device according to one embodiment of the invention.

FIG. 1 is a block diagram showing the configuration of a digital hybrid machine 10 which is an example of an image forming apparatus provided with a sheet transport device 9 according to the embodiment of the invention. Referring to FIG. 1, the digital hybrid machine 10 comprises a control block 11 for performing overall control of the digital hybrid machine 10, a dynamic random access memory (DRAM) 12 in and from which information, such as image data, is written and read, an operating block 13 for establishing a man-machine interface between the digital hybrid machine 10 and a human user, the operating block 13 including a display screen for displaying information provided by the digital hybrid machine 10, a document feeder 14 for automatically feeding each sheet of an original document set on an original tray 73 (FIG. 2) to a specified original reading position and ejecting the original to an original output tray 74 (FIG. 2), an original reading block 15 including a scanner 71 for reading image data from the original at the original reading position after the original has been transported thereto, an image forming portion 16 for forming an image represented by the image data read by the original reading block 15 on a sheet, a sheet feeding mechanism 23 for feeding the sheet from a stack of sheets stored in a paper cassette 100 (FIG. 2) to the image forming portion 16 and ejecting the sheet to a sheet output tray 110 (FIG. 2) upon completion of each image forming operation, a hard disk 17 for storing various kinds of information including the image data, a facsimile communication block 18 connected to a public communications line 20 and a network interface block 19 connected to a network 21. The sheet transport device 9 of this embodiment of the invention includes the aforementioned sheet feeding mechanism 23.

The control block 11 compresses and encodes the image data fed from the original reading block 15 and stores the image data thus processed in the DRAM 12. The control block 11 decompresses and decodes the image data written in the DRAM 12 when requested. Using the image data decompressed and decoded, the control block 11 causes the image forming portion 16 to form an original image represented by the image data which has been decompressed and decoded.

The digital hybrid machine 10 of this embodiment works as a copying machine which forms an image in the image forming portion 16 by using the image data read by the original reading block 15 and once stored in the DRAM 12. The digital hybrid machine 10 also works as a printer which forms an image in the image forming portion 16 by using image data transmitted from a personal computer 22 connected to the network 21 through the network interface block 19 and once stored in the DRAM 12. Furthermore, the digital hybrid machine 10 works as a facsimile machine which forms an image in the image forming portion 16 by using image data transmitted from the public communications line 20 through the facsimile communication block 18 and once stored in the DRAM 12. When working as a facsimile machine, the digital hybrid machine 10 can also transmits the image data read from the original by the original reading block 15 into the public communications line 20 through the facsimile communication block 18. The digital hybrid machine 10 performs multiple functions related to image forming operation, including functions of the copying machine, the printer and the facsimile machine as mentioned above. Accordingly, the digital hybrid machine 10 is configured to enable the user to make various detailed settings concerning the individual functions.

Arrows shown by two parallel lines in FIG. 1 indicate flows of the image data while arrows shown by a thin line indicate flows of control signals or control data.

Figure 2:
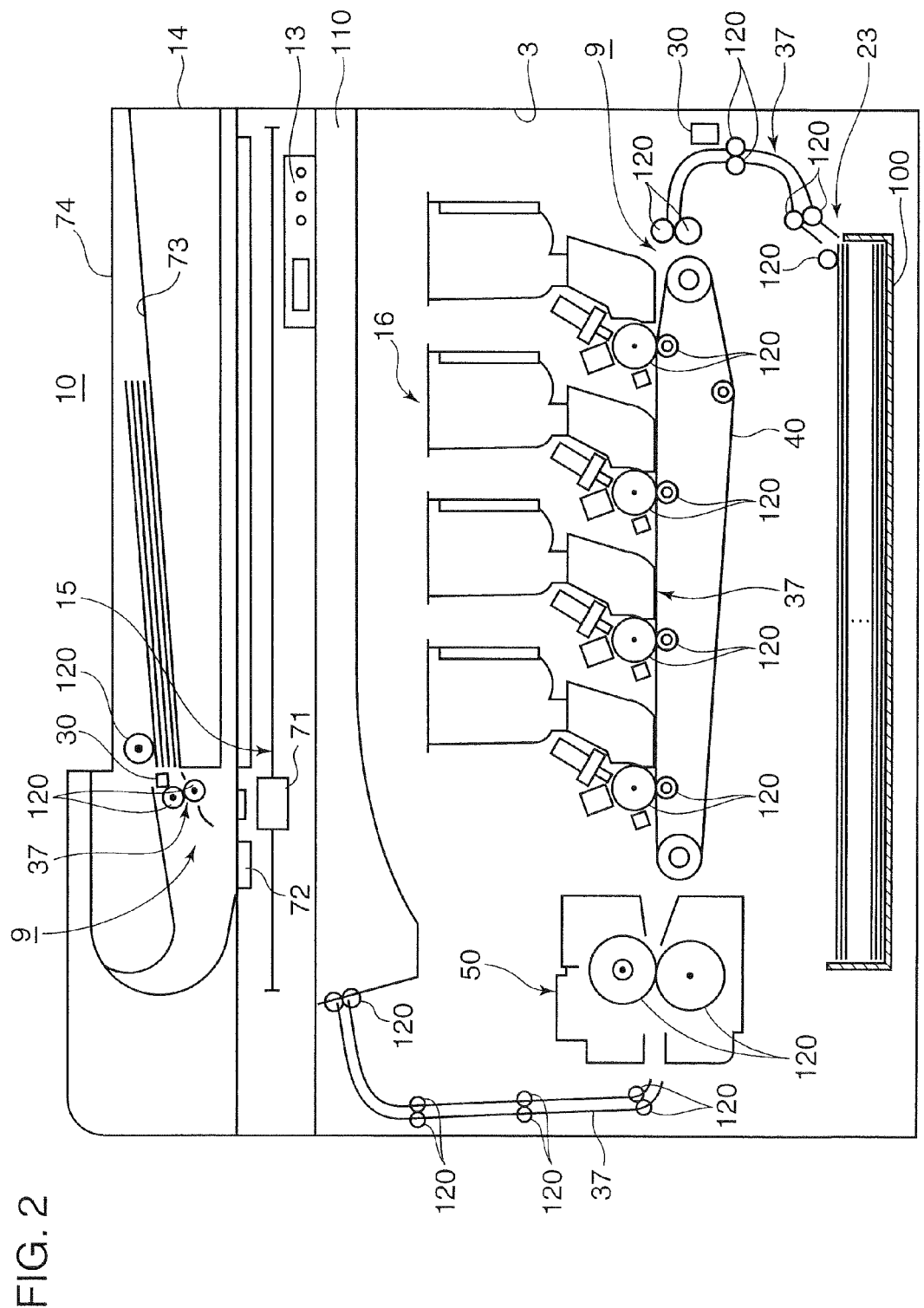
FIG. 2 is a cross-sectional diagram showing the mechanical structure of the digital hybrid machine which is an example of the image forming apparatus provided with the sheet transport device according to the embodiment of the invention.

The sheet transport device 9 includes the sheet feeding mechanism 23 as mentioned above. Referring to FIG. 2, the sheet transport device 9 further includes various kinds of rollers 120, the aforementioned paper cassette 100, an image transfer belt 40, a paper path 37 and the aforementioned sheet output tray 110. The paper path 37 is a channel running from the paper cassette 100 up to the sheet output tray 110 by way of the image forming portion 16 and a fixing portion 50. As the various kinds of rollers 120 rotate, a topmost one of the sheets stored in the paper cassette 100 is fed therefrom and transported through the paper path 37 in the direction toward the sheet output tray 110 by way of the image forming portion 16 and the fixing portion 50. A sensing device 30 is provided immediately beside the paper path 37 as shown in FIG. 2.

The sheet transport device 9 also includes the aforementioned document feeder 14 as will be further discussed later in this Specification. As shown in FIG. 2, the document feeder 14 includes various kinds of rollers 120, the aforementioned original tray 73, a document path (hereinafter a document path is called "a sheet path")37 and the aforementioned original output tray 74. The sheet path 37 is a channel running from the original tray 73 to the original output tray 74 passing a point immediately above an original reading window 72. As the various kinds of rollers 120 rotate, the original is fed from the original tray 73 in the direction toward the original output tray 74 through the point immediately above the original reading window 72. The sensing device 30 is provided immediately beside the sheet path 37 as shown in FIG. 2.

The aforementioned original reading window 72 is an aperture through which the original reading block 15 acquires the image data by reading the original located immediately above original reading window 72. More specifically, the original positioned above the original reading window 72 is read by the scanner 71 which is located immediately below the original reading window 72.

Figure 3:
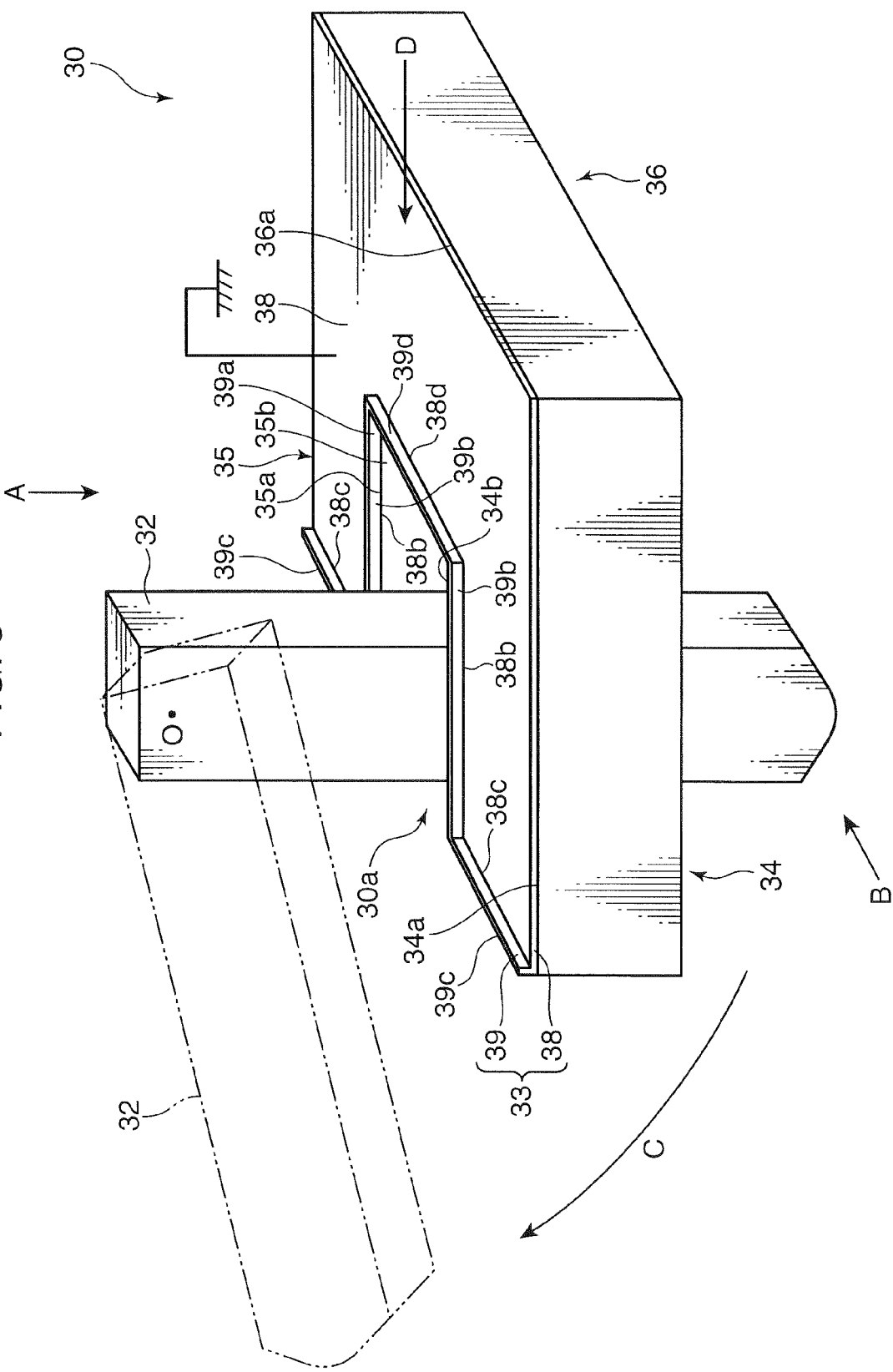
FIG. 3 is a perspective view showing an example of a sensor.
Figure 4:
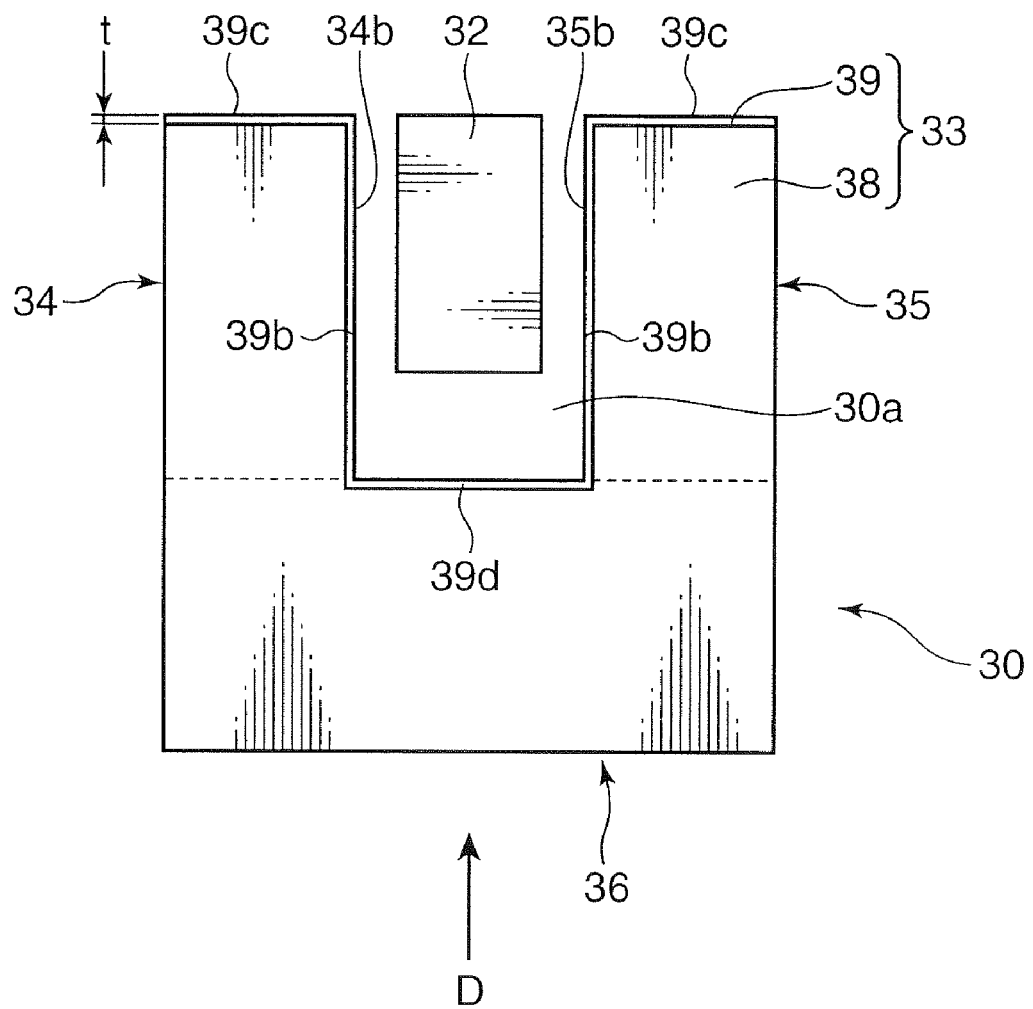
FIG. 4 is a diagram showing the sensor of FIG. 3 as seen from the direction of arrow A shown in FIG. 3.
Figure 5:
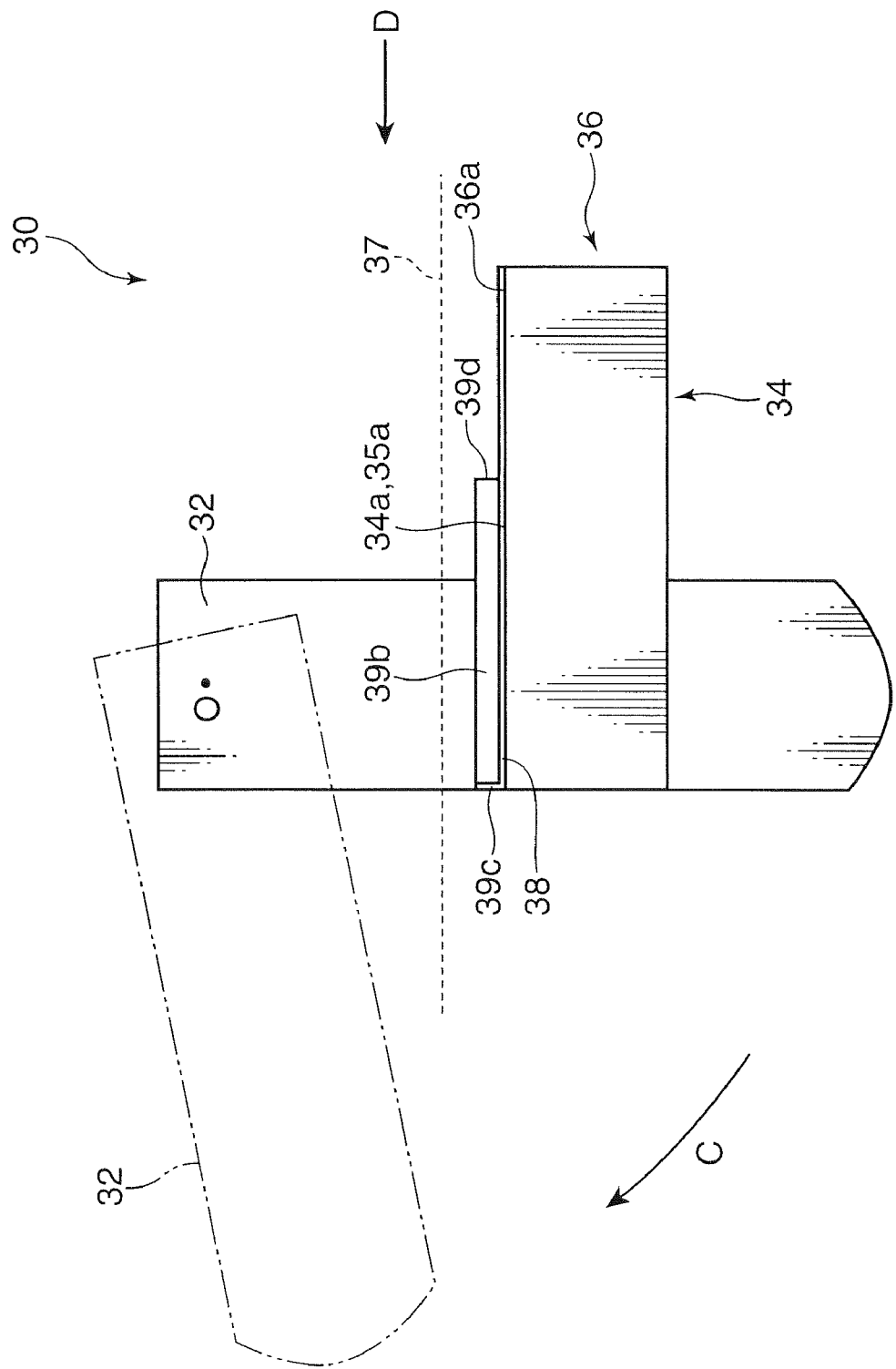
FIG. 5 is a diagram showing the sensor of FIG. 3 as seen from the direction of arrow B shown in FIG. 3.

The sheet transport device 9 has the paper path 37 through which the sheet is transported as described above. Also, the sheet transport device 9 is provided with the sensing device 30 which detects whether the sheet has passed a particular point in the paper path 37. FIG. 3 is a perspective view showing an example of the sensing device 30, FIG. 4 is a diagram showing the sensing device 30 of FIG. 3 as seen from the direction of arrow A shown in FIG. 3, and FIG. 5 is a diagram showing the sensing device 30 of FIG. 3 as seen from the direction of arrow B shown in FIG. 3. Shown by a broken line in FIG. 5 is the aforementioned paper path 37. The sensing device 30 is now described in detail with reference to FIGS. 3 to 5, wherein arrow D shows a direction in which the sheet is transported.

Constituting part of the paper path 37, the sensing device 30 is disposed at a particular point in the paper path 37 through which the sheet is transported. Specifically, the sensing device 30 provided close to the sheet feeding mechanism 23 is mounted at the particular point between the paper cassette 100 and the sheet output tray 110. This sensing device 30 is a PI sensor including a light-emitting element 34 and a light-sensitive element 35.

As shown in FIG. 3, the light-emitting element 34 serving as a first element of the appended claims is formed into a parallelepipedic shape, the light-emitting element 34 having a light-emitting surface 34b (shown in FIG. 4) from which light is emitted. The light-sensitive element 35 serving as a second element of the appended claims is also formed into a parallelepipedic shape, the light-sensitive element 35 having a light-receiving surface 35b which receives the light emitted from the light-emitting surface 34b. As shown in FIGS. 3 and 4, the light-emitting element 34 and the light-sensitive element 35 each have the parallelepipedic shape of which longitudinal direction is parallel to the direction of arrow D in which the sheet is transported.

The light-emitting element 34 and the light-sensitive element 35 of the sensing device 30 are located on a common plane along the paper path 37. The sensing device 30 is so structured that a space 30a is formed between the light-emitting element 34 and the light-sensitive element 35. The sensing device 30 includes an interposed element 32 which can be inserted into and withdrawn from this space 30a. The light-emitting surface (third surface) 34b and the light-receiving surface (fourth surface) 35b of the sensing device 30 are directed face to face with each other on both sides of the space 30a. The light-emitting element 34 and the light-sensitive element 35 are connected to each other by a parallelepipedic-shaped connecting part 36 located at an end of the sensing device 30 in a direction opposite to the direction of arrow D. Thus, the sensing device 30 including the light-emitting element 34, the light-sensitive element 35 and the connecting part 36 is generally U-shaped as seen from the direction of arrow A shown in FIG. 3.

The sensing device 30 includes the interposed element 32 as mentioned above. The interposed element 32 is structured to extend in a direction perpendicular to the direction of arrow D when positioned in the space 30a between the light-emitting element 34 and the light-sensitive element 35. The interposed element 32 is made swingable into and out of the space 30a formed in the sensing device 30, so that the interposed element 32 can be inserted into and withdrawn from the space 30a between the light-emitting element 34 and the light-sensitive element 35. The interposed element 32 swings when the sheet passes the position in the paper path 37 where the sensing device 30 is mounted. Specifically, the sheet passing through the paper path 37 is detected by the sensitive device 30, depending on whether the interposed element 32 interrupts the light emitted from the light-emitting surface 34b or not.

More specifically, the interposed element 32 is supported swingably about a point O shown in FIGS. 3 and 5. When the sheet transported through the paper path 37 in the direction of arrow D goes into contact with the interposed element 32, the interposed element 32 swings in the direction of arrow C by a specific angle about the point O. This is because the interposed element 32 is pushed by the sheet due to kinetic energy thereof. Since the interposed element 32 swings in the direction of arrow C (FIG. 3) about the point O, the interposed element 32 moves from within the space 30a to the outside thereof. When the interposed element 32 is withdrawn from the space 30a in this way, the interposed element 32 does not interrupt the light emitted from the light-emitting surface 34b, allowing the light to reach the second surface 35a. As a result, the sensing device 30 senses that the sheet has passed the particular point in the paper path 37. Alternate long and short dashed lines in FIGS. 3 and 5 show the interposed element 32 which has swung in the direction of arrow C by a specific angle.

When there exists no sheet passing through the paper path 37, the interposed element 32 does not swing as mentioned above since no kinetic energy acts on the interposed element 32. Consequently, the interposed element 32 remains in the space 30a formed between the light-emitting element 34 and the light-sensitive element 35, thus interrupting the light emitted from the light-emitting surface 34b. In this case, the sensing device 30 senses that no sheet has passed the particular point in the paper path 37.

The sensing device 30 is provided with a discharge arrester 33 made of an electrically conductive element which is grounded, the discharge arrester 33 being formed into the shape of a thin sheet having a thickness t as shown in FIG. 4. In FIGS. 3 to 5, the thickness of the discharge arrester 33 is shown larger than the actual thickness t for ease of understanding.

The discharge arrester 33 is formed to cover the light-emitting element 34 and the light-sensitive element 35 of the sensing device 30 on a side facing the paper path 37. Specifically, as illustrated in FIGS. 3 and 5, the light-emitting element 34 and the light-sensitive element 35 have a first surface 34a and a second surface 35a facing and parallel to the paper path 37, respectively. Arranged to cover the entirety of the first surface 34a and the second surface 35a, the discharge arrester 33 protects the sensing device 30 against a discharge of static electricity from the sheet passing through the paper path 37.

The discharge arrester 33 includes a flat portion 38 and a bent portion (projecting part) 39. The flat portion 38 is a flat-shaped sheetlike part configured to cover the entirety of the first and second surfaces 34a, 35a of the light-emitting and light-sensitive elements 34, 35 and a fifth surface 36a of the connecting part 36 facing the paper path 37.

Referring to FIG. 3, the flat portion 38 of the discharge arrester 33 includes first space-side edges 38b extending along edges of the first and second surfaces 34a, 35a on sides of the space 30a, the flat portion 38 extending from the first space-side edges 38b away from the space 30a. The flat portion 38 also includes a second space-side edge 38d extending along an edge of the fifth surface 36a of the connecting part 36 facing the paper path 37, the flat portion 38 extending from the second space-side edge 38d away from the space 30a.

The flat portion 38 of the discharge arrester 33 further includes downstream edges 38c located at downstream ends in the direction of arrow D of the first and second surfaces 34a, 35a of the light-emitting and light-sensitive elements 34, 35, the downstream edges 38c extending along the edges of the first and second surfaces 34a, 35a perpendicular to the direction of arrow D. The flat portion 38 extends from the downstream edges 38c in the direction opposite to the direction of arrow D.

The aforementioned bent portion 39 is part of the discharge arrester 33 formed by bending the same in a direction intersecting the paper path 37. In this embodiment, the bent portion 39 is formed by bending the discharge arrester 33 along ends of the flat portion 38 in the direction of the paper path 37. Specifically, the bent portion 39 is formed by bending the discharge arrester 33 in a direction perpendicular to the surfaces 34a, 35a, 36a facing the paper path 37.

The bent portion 39 thus formed includes first bent parts 39b, second bent parts 39c and a third bent part 39d. The first bent parts 39b are formed by bending the flat portion 38 of the discharge arrester 33 about each of the first space-side edges 38b of the flat portion 38 on the first and second surfaces 34a, 35a. The second bent parts 39c are formed by bending the flat portion 38 of the discharge arrester 33 about each of the downstream edges 38c located at the downstream ends in the direction of arrow D of the first and second surfaces 34a, 35a of the light-emitting and light-sensitive elements 34, 35 and extending along the edges of the first and second surfaces 34a, 35a perpendicular to the direction of arrow D. Also, the third bent part 39d is formed by bending the flat portion 38 of the discharge arrester 33 about the second space-side edge 38d extending along the edge of the fifth surface 36a of the connecting part 36 on the side of the space 30a facing the paper path 37.

The first bent part 39b and the second bent part 39c of the discharge arrester 33 provided on the light-emitting element 34 are located at the same side of the flat portion 38 as the light-emitting surface 34b of the light-emitting element 34 and at one downstream end of the flat portion 38 of the discharge arrester 33 in the direction of arrow D, respectively, as shown in the above discussion. Also, the first bent part 39b and the second bent part 39c of the discharge arrester 33 provided on the light-sensitive element 35 are located at the same side of the flat portion 38 as the light-receiving surface 35b of the light-sensitive element 35 and at the other downstream end of the flat portion 38 of the discharge arrester 33 in the direction of arrow D, respectively. Additionally, the third bent part 39d is provided at a downstream end of the connecting part 36 in the direction of arrow D just between the light-emitting element 34 and the light-sensitive element 35.

The bent portion 39 of the discharge arrester 33 has a pair of side surfaces 39a facing the space 30a formed between the light-emitting element 34 and the light-sensitive element 35, the individual side surfaces 39a being structured flush with the light-emitting surface 34b and the light-receiving surface 35b.

As described in the foregoing discussion, the sheet transport device 9 is provided with the discharge arrester 33 for protecting the sensing device 30 against the discharge of static electricity, the discharge arrester 33 including the bent portion 39 formed by bending the same in the direction intersecting the paper path 37. The discharge arrester 33 thus structured protects the light-emitting element 34 and the light-sensitive element 35 of the sensing device 30 from the discharge of static electricity without narrowing the space 30a between the light-emitting element 34 and the light-sensitive element 35 in which the interposed element 32 swings. This structure serves to properly protect the light-emitting element 34 and the light-sensitive element 35 of the sensing device 30 from the discharge of static electricity and thereby ensure normal operation of the light-emitting element 34 and the light-sensitive element 35.

Since the bent portion 39 of the discharge arrester 33 is formed by bending the same in the direction in which the paper path 37 is situated, a tip end of the bent portion 39 is located closest to the paper path 37 and, thus, a static charge accumulated in the sheet can easily be released to the bent portion 39. Therefore, the light-emitting element 34 and the light-sensitive element 35 of the sensing device 30 can be properly protected from the discharge of static electricity.

The digital hybrid machine 10 including the sheet transport device 9 thus structured provides the aforementioned advantageous effects.

Figure 6:
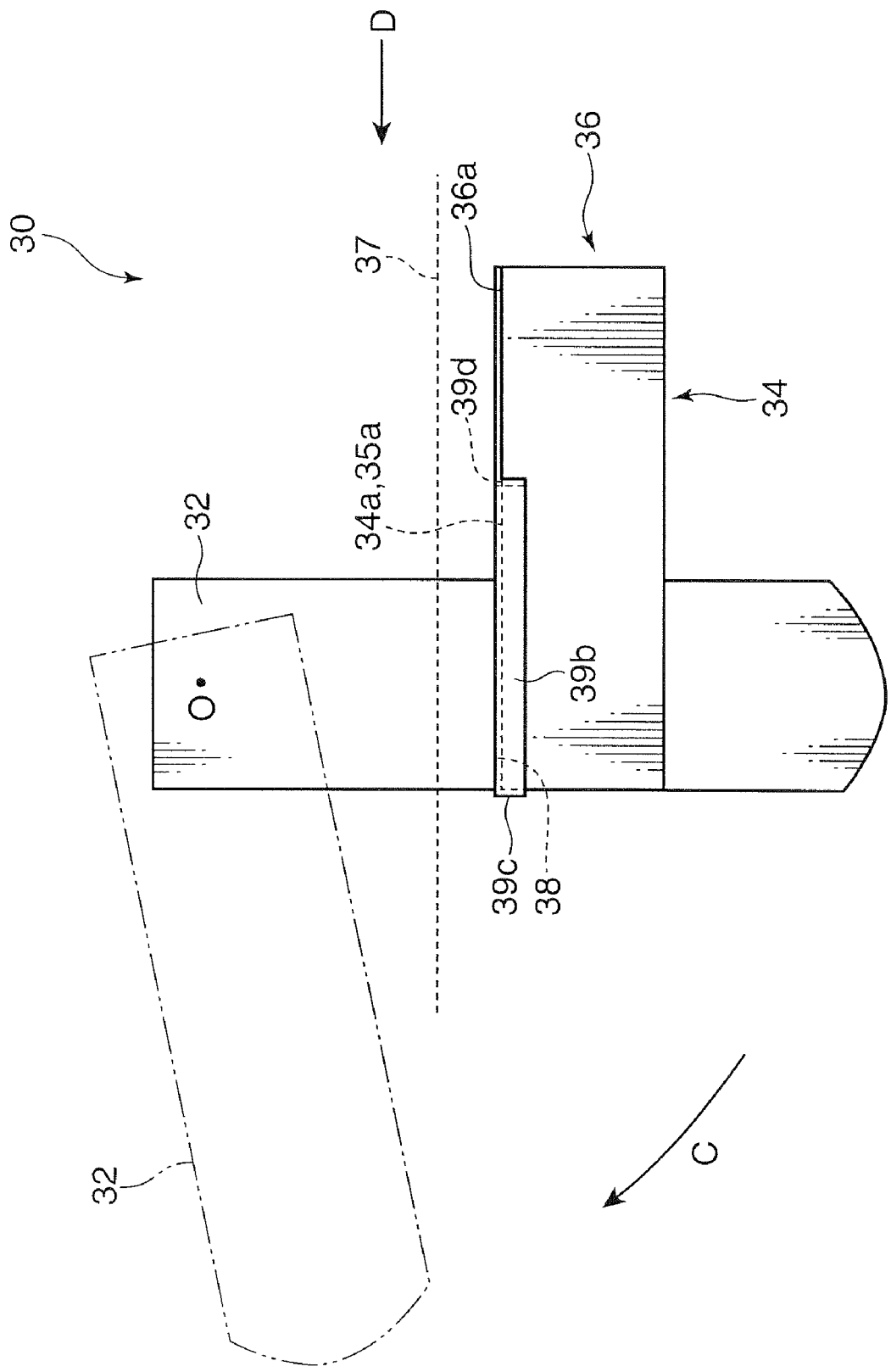
FIG. 6 is a cross-sectional diagram showing another structure of the sensor in which the first to third bent parts of the discharge arrester are formed to extend in both the direction toward the paper path and the direction opposite thereto.

While the foregoing discussion of the embodiment has dealt with an example in which the bent portion 39 of the discharge arrester 33 is formed by bending the ends of the flat portion 38 of the discharge arrester 33 in the direction in which the paper path 37 is situated, the invention is not limited to this structure. As an alternative, the first to third bent parts 39b, 39c, 39d may be formed by bending the ends of the flat portion 38 of the discharge arrester 33 in a direction opposite to the direction in which the paper path 37 is situated as shown in FIG. 6. As the light-emitting element 34 and the light-sensitive element 35 are covered by the first to third bent parts 39b, 39c, 39d at least in part in this alternative structure, it is possible to properly protect the light-emitting element 34 and the light-sensitive element 35.

Figure 7:
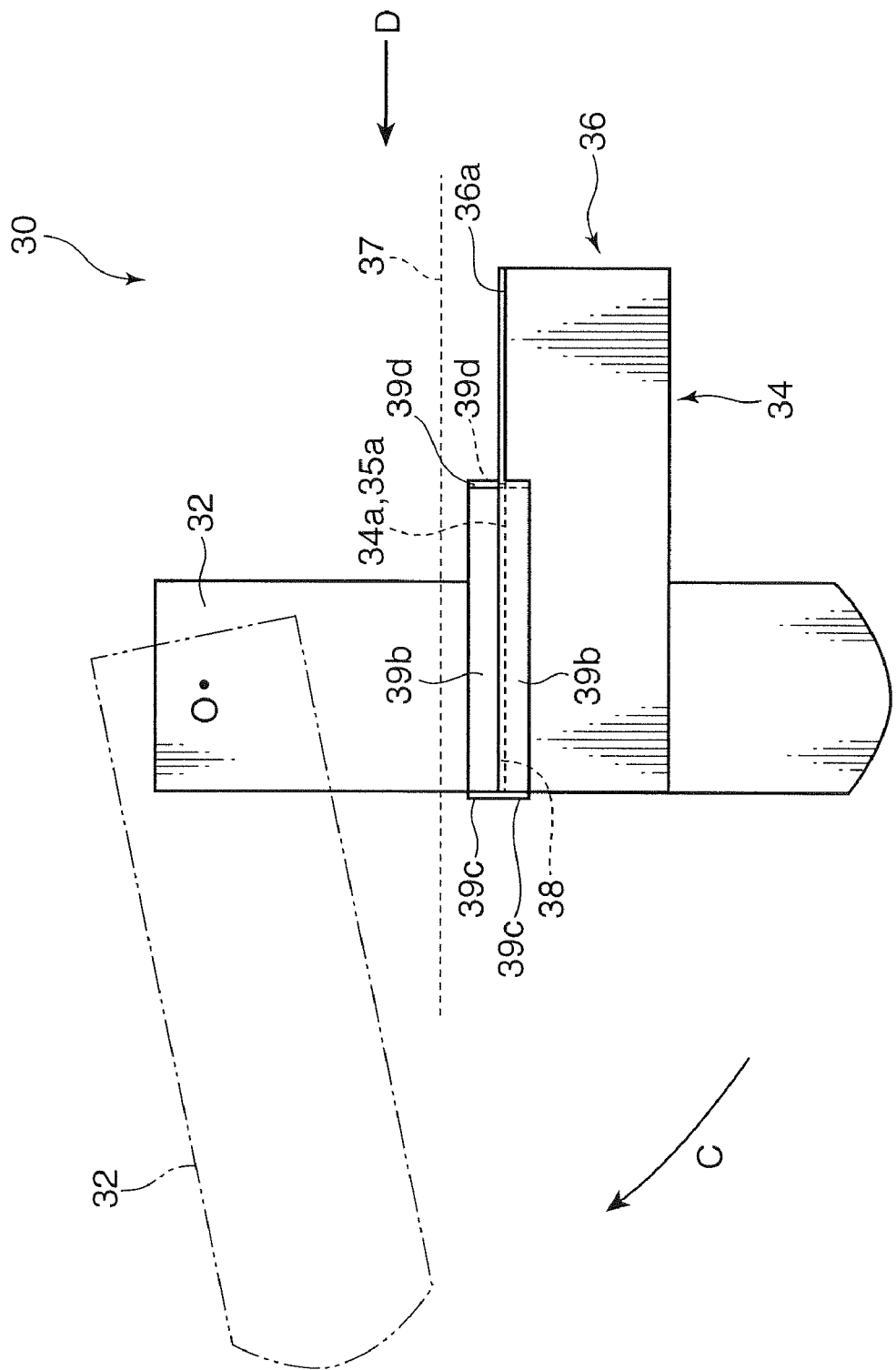
FIG. 7 is a cross-sectional diagram showing one structure of the sensor in which first to third bent parts of a discharge arrester are formed to extend in a direction opposite to a direction toward a paper path.

Another alternative is to form the bent portion 39 of the discharge arrester 33 by bending the ends of the flat portion 38 thereof in both the direction in which the paper path 37 is situated and the direction opposite thereto. For example, the first to third bent parts 39b, 39c, 39d may be structured to extend in both the direction toward the paper path 37 and the direction opposite thereto as shown in FIG. 7.

Figure 8:
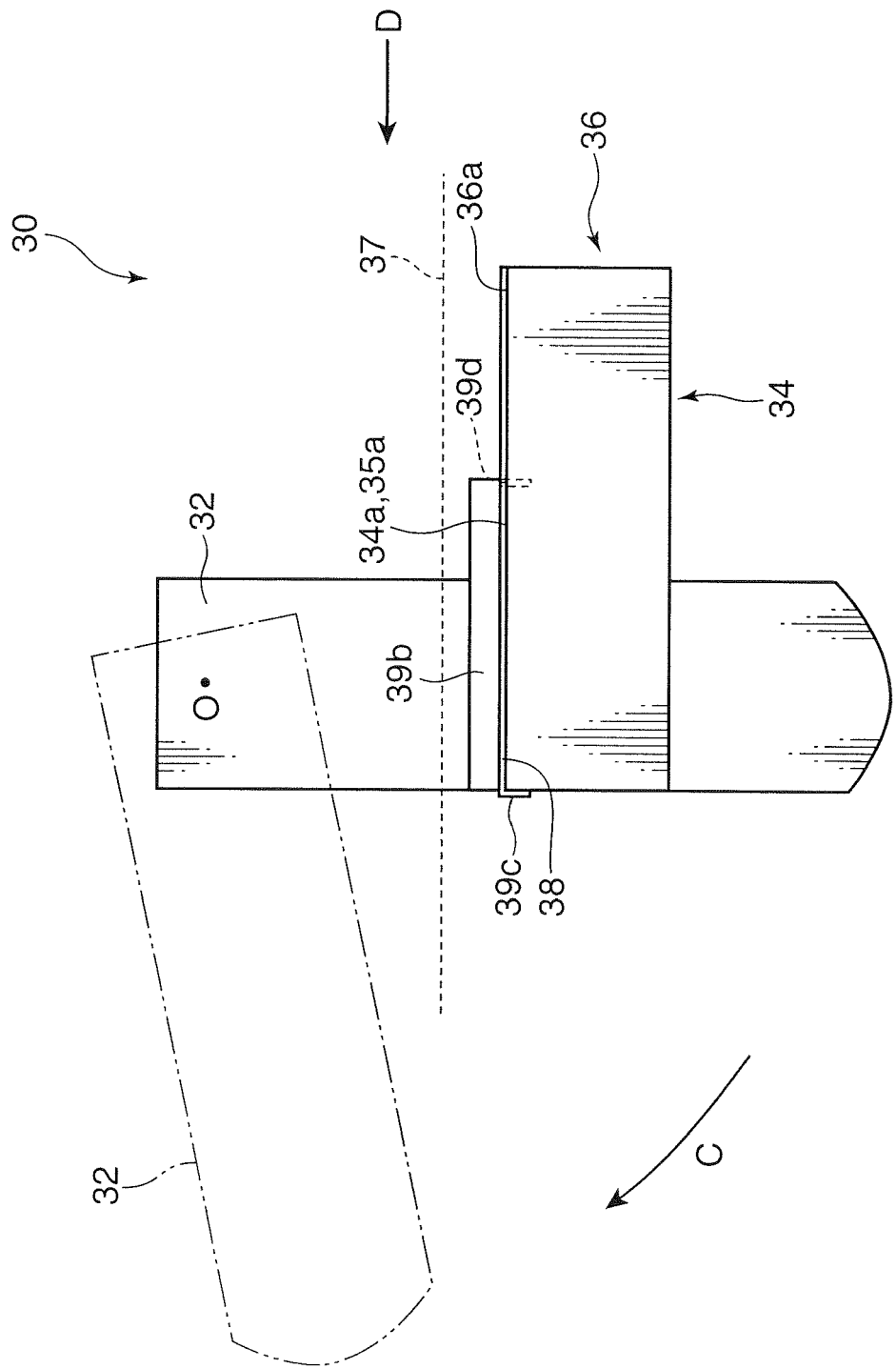
FIG. 8 is a cross-sectional diagram showing still another structure of the sensor in which the first bent parts are formed to extend in the direction toward the paper path while the second and third bent parts are formed to extend in the direction opposite to the direction toward the paper path.

Still another alternative is to form the bent portion 39 of the discharge arrester 33 by bending the ends of the flat portion 38 thereof selectively in the direction in which the paper path 37 is situated and the direction opposite thereto. FIG. 8 shows an example in which the first bent parts 39b provided on the light-emitting surface 34b and the light-receiving surface 35b are formed by bending the ends of the flat portion 38 of the discharge arrester 33 in the direction in which the paper path 37 is situated, whereas the bent parts of the discharge arrester 33 other than those provided on the light-emitting surface 34b and the light-receiving surface 35b are (i.e., the second and third bent parts 39c, 39d) are formed by bending the ends of the flat portion 38 of the discharge arrester 33 in the direction opposite to the direction in which the paper path 37 is situated.

Figure 9:
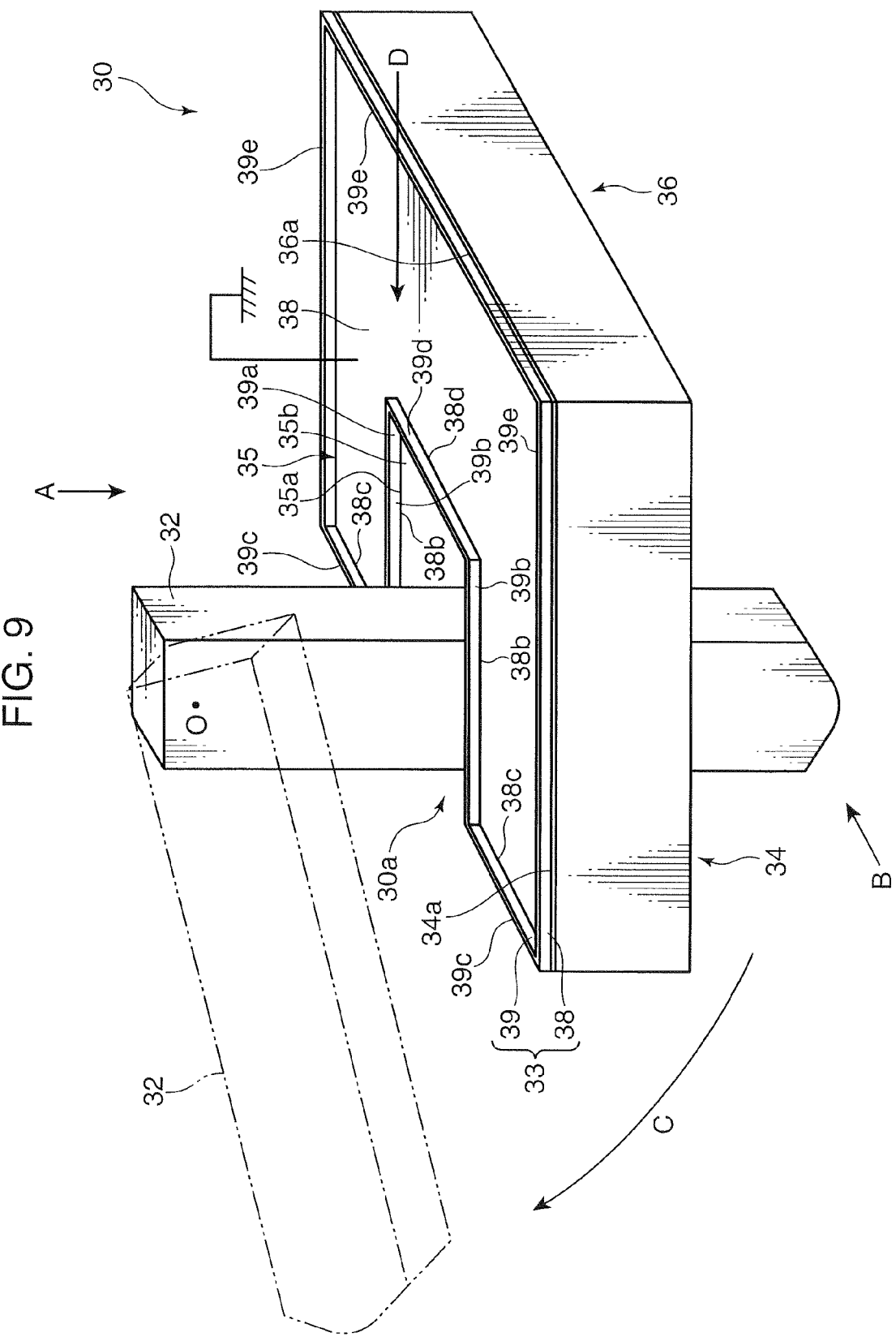
FIG. 9 is a perspective view showing an alternative structure of the sensor in which a bent portion of the discharge arrester surrounds a flat portion thereof.

While the foregoing embodiment has illustrated an example in which the bent portion 39 is formed by bending part of the discharge arrester 33 on surfaces forming the space 30a between the light-emitting element 34 and the light-sensitive element 35, the invention is not limited to this structure. For example, the bent portion 39 may be formed to all along a periphery of the flat portion 38 of the discharge arrester 33 (refer to FIG. 9). In the example shown FIG. 9, the bent portion 39 of the discharge arrester 33 includes, in addition to the aforementioned first to third bent parts 39b, 39c, 39d, fourth bent parts 39e which are formed to extend in the direction toward the paper path 37 at a right angle (90 degrees) to the first and second surfaces 34a, 35a of the light-emitting and light-sensitive elements 34, 35 and the fifth surface 36a of the connecting part 36.

Figure 10:
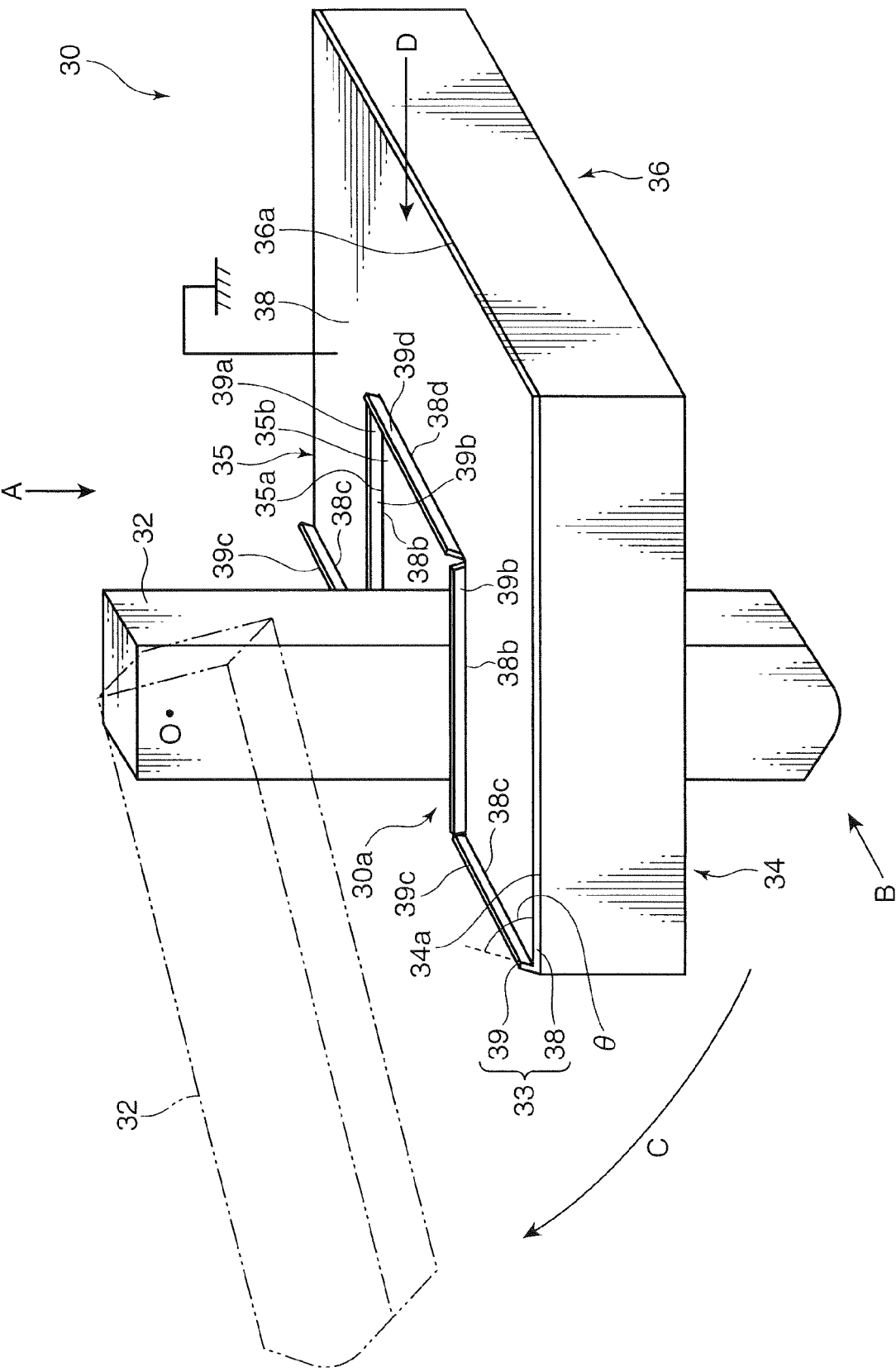
FIG. 10 is a perspective view showing another alternative structure of the sensor in which the first to third bent parts of the discharge arrester extend in an oblique direction with respect to the flat portion (first, second and fifth surfaces) of the discharge arrester, forming an acute angle therewith.

Furthermore, while the foregoing embodiment has illustrated an example in which the bent portion 39 of the discharge arrester 33 is formed by bending the flat portion 38 thereof in the direction perpendicular to the surfaces 34a, 35a, 36a facing the paper path 37, the invention is not limited to this structure. Alternatively, the bent portion 39 of the discharge arrester 33 may be formed by bending the flat portion 38 thereof in an oblique direction with respect to the surfaces 34a, 35a, 36a facing the paper path 37. Specifically, in this alternative structure, the aforementioned first to third bent parts 39b, 39c, 39d are formed to extend in directions toward the paper path 37, forming an acute angle θ with the flat portion 38 as shown in FIG. 10, for example.

While the invention has been discussed, by way of example, focusing primarily on the sensing device 30 provided close to the sheet feeding mechanism 23 of the sheet transport device 9 for feeding the sheet, the above-described structure of the sensing device 30 is equally applicable to the earlier-mentioned sensing device 30 provided in the document feeder 14 for automatically feeding each sheet of an original document. This sensing device 30 is mounted at a particular point between the original tray 73 and the original output tray 74 immediately beside the sheet path 37.

While the invention has thus far been described with reference to the preferred embodiment and alternatives thereof, the above-described arrangements are simply illustrative and do not limit the present invention. It is to be recognized that modifications and/or alterations of the embodiment can easily be done by those skilled in the art within the spirit and scope of the invention and equivalents thereof.

Having described the specific embodiment and alternatives thereof in detail, principal arrangements and features of the invention can be summarized as follows.

In one aspect of the invention, a sheet transport device comprises a sheet feeding path through which a sheet is transported, first and second elements which are located face to face with a particular point in the sheet feeding path and have first and second surfaces, respectively, constituting part of the sheet feeding path and arranged therealong, an interposed element disposed insertably into and withdrawably from a space formed between the first and second elements, and a discharge arrester disposed in first and second surfaces for providing protection against a discharge of static electricity from the sheet, wherein the discharge arrester having a projecting part extending in a direction intersecting the sheet feeding path.

In the sheet transport device thus structured, the discharge arrester disposed along the first and second surfaces of the first and second elements along the sheet path has the projecting part extending in the direction intersecting the sheet feeding path. For this reason, no matter how small the amount of projection of the projecting part in the direction intersecting the sheet feeding path, a tip end of the projecting part is located closest to the sheet feeding path. It is therefore possible to properly protect the first and second elements from a discharge of static electricity without increasing a total surface area of the discharge arrester disposed along the first and second surfaces of the first and second elements.

Therefore, the aforementioned structure of the sheet transport device can properly protect elements constituting the sheet feeding path against the discharge of static electricity without narrowing the space between the first and second elements in and from which the interposed element is inserted and withdrawn. Thus, it is appreciated that the structure of the invention serves to provide adequate protection to the elements from the discharge of static electricity, thereby assuring normal operation of these elements.

Preferably, the aforementioned sheet transport device is structured such that the first and second surfaces of the first and second elements are flat surfaces parallel to the sheet feeding path and the projecting part of the discharge arrester extends in a direction at a right angle (90 degrees) to each of the first and second surfaces.

Since the tip end of the projecting part of the discharge arrester is located closest to the sheet feeding path in this structure, the static electricity released from the sheet being transported through the sheet feeding path can more easily reach the tip end of the projecting part. Also, the tip end of the projecting part does not extend in a direction toward the space formed between the first and second elements, so that the interposed element can be inserted into and withdrawn from this space more smoothly.

Preferably, the aforementioned sheet transport device is structured such that the first and second surfaces of the first and second elements are flat surfaces parallel to the sheet feeding path and the projecting part of the discharge arrester extends in a direction forming an acute angle with each of the first and second surfaces.

Since the tip end of the projecting part of the discharge arrester is located closest to the sheet feeding path in this structure, the static electricity released from the sheet being transported through the sheet feeding path can more easily reach the tip end of the projecting part. Again, the tip end of the projecting part does not extend in a direction toward the space formed between the first and second elements, so that the interposed element can be inserted into and withdrawn from this space more smoothly.

Preferably, the aforementioned sheet transport device is structured such that the projecting part of the discharge arrester extends in a direction toward the sheet feeding path.

In this structure, the projecting part of the discharge arrester is located closer to the sheet feeding path, so that the static electricity released from the sheet being transported through the sheet feeding path can more easily reach the tip end of the projecting part. Thus, the first and second elements are properly protected from the discharge of static electricity.

Also preferably, the aforementioned sheet transport device is structured such that the projecting part of the discharge arrester extends also in a direction opposite to the direction toward the sheet feeding path.

In this structure, the static electricity released from the sheet being transported through the sheet feeding path can more easily reach the tip end of the projecting part extending in the direction toward the sheet feeding path. Since the projecting part extends also in the direction opposite to the direction toward the sheet feeding path, the first and second elements are covered by the discharge arrester. Thus, the static electricity is kept from reaching portions of the first and second elements other than the first and second surfaces thereof. Therefore, the first and second elements are properly protected from the discharge of static electricity.

Also preferably, the aforementioned sheet transport device is structured such that the projecting part of the discharge arrester extends in a direction opposite to a direction toward the sheet feeding path.

In this structure, the discharge arrester can cover at least part of the first and second elements, so that the static electricity is kept from reaching portions of the first and second elements other than the first and second surfaces thereof. Therefore, the first and second elements are properly protected from the discharge of static electricity.

Preferably, the aforementioned sheet transport device is structured such that the first and second elements respectively have third and fourth surfaces facing each other, the sheet transport device further comprising a sensor for detecting the sheet transported through the sheet feeding path, the sensor having a light-emitting surface formed by the third surface from which light is emitted and a light-receiving surface formed by the fourth surface which receives the light emitted from the light-emitting surface.

In this sheet transport device, the interposed element is configured to interrupt the light emitted from the light-emitting surface when positioned within the space between the first and second elements, and the sensor is configured to detect the sheet depending on whether or not the light emitted from the light-emitting surface is interrupted by the interposed element.

In the sheet transport device thus structured, the sensor detects the sheet transported through the sheet feeding path depending on whether the interposed element positioned within the space formed between the first and second elements interrupts the light emitted from the light-emitting surface. The interposed element does not extend in the direction toward the space between the first and second elements in and from which the interposed element is inserted and withdrawn. This structure of the invention provides the sheet transport device in which the sensor is properly protected from the discharge of static electricity. In this structure, the interposed element can smoothly move in the space formed between the first and second elements, assuring normal operation of the sensor.

Preferably, the sheet transport device thus structured further comprises a connecting part interconnecting the first and second elements, forming the aforementioned space in between.

Since the first and second elements are connected to each other by the connecting part while forming the space in between in this structure, the space in and from which the interposed element is inserted and withdrawn kept unchanged in volumetric capacity. This assures smooth insertion and withdrawal of the interposed element into and out of the space between the first and second elements.

Still preferably, the projecting part of the discharge arrester is formed by bending a thin board. This makes it possible to easily form the projecting part.

In one preferable form of the invention, the sheet transport device structured as mentioned above further comprises a sheet feeder for transporting the sheet on which an image is formed. The sheet transport device thus structured enables the sensor to produce the aforementioned advantageous effects in detecting the sheet fed by the sheet feeder and transported through the sheet feeding path.

In another preferable form of the invention, the sheet transport device structured as mentioned above further comprises a document feeder for transporting the sheet carrying an original image from which an image to be formed is obtained. The sheet transport device thus structured enables the sensor to produce the aforementioned advantageous effects in detecting the original sheet fed by the document feeder and transported through the sheet feeding path.

In a second aspect of the invention, an image forming apparatus comprises a sheet transport device structured as mentioned above and an image forming device for forming an image.

Since this image forming apparatus is provided with the sheet transport device of the aforementioned first aspect of the invention, it is possible to obtain the same advantageous effects as mentioned above.

This application is based on Japanese Patent Application Serial No. 2008-194019, filed in Japan Patent Office on Jul. 28, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A sheet transport device comprising:
    a sheet feeding path through which a sheet is transported;
    first and second elements which are located face to face with a particular point in said sheet feeding path and have first and second surfaces, respectively, constituting part of said sheet feeding path and arranged therealong;
    an interposed element disposed insertably into and withdrawably from a space formed between said first and second elements; and
    a discharge arrester disposed at least on the first and second surfaces for providing protection against a discharge of static electricity from the sheet,
    wherein said discharge arrester has a projecting part extending in a direction intersecting said sheet feeding path, and
    said projecting part is formed by bending an end of said discharge arrester toward said sheet feeding path and in a direction intersecting a sheet feeding direction along said sheet feeding path.

2. The sheet transport device according to claim 1, wherein the first and second surfaces of said first and second elements are flat surfaces parallel to said sheet feeding path and the projecting part of said discharge arrester extends in a direction at a right angle to each of the first and second surfaces.

3. The sheet transport device according to claim 1, wherein the first and second surfaces of said first and second elements are flat surfaces parallel to said sheet feeding path and the projecting part of said discharge arrester extends in a direction forming an acute angle with each of the first and second surfaces.

4. The sheet transport device according to of claim 1, wherein said discharge arrester includes a second projecting part extending in a direction opposite to the direction toward said sheet feeding path.

5. The sheet transport device according to claim 1, wherein said first and second elements respectively have third and fourth surfaces facing each other, said sheet transport device further comprising:
    a sensor for detecting the sheet transported through said sheet feeding path, said sensor having a light-emitting surface formed by the third surface from which light is emitted and a light-receiving surface formed by the fourth surface which receives the light emitted from the light-emitting surface; and
    wherein said interposed element is configured to interrupt the light emitted from the light-emitting surface when positioned within the space between said first and second elements, and said sensor is configured to detect the sheet depending on whether or not the light emitted from the light-emitting surface is interrupted by said interposed element.

6. The sheet transport device according to claim 1 further comprising a connecting part interconnecting said first and second elements, forming said space in between.

7. The sheet transport device according to claim 1 further comprising a sheet feeder for transporting the sheet on which an image is formed.

8. The sheet transport device according to claim 1 further comprising a document feeder for transporting the sheet carrying an original image from which an image to be formed is obtained.

9. An image forming apparatus comprising a sheet transport device according to claim 1 and an image forming device for forming an image.

10. A sheet transport device comprising:

a sheet feeding path defining a sheet feeding direction along which a sheet is transported;

a sensor in proximity to the sheet feeding path and having first and second elements formed respectively with first and second surfaces facing the sheet feeding path and defining a part of the sheet feeding path;

an interposed element insertable into and withdrawable from a space formed between said first and second elements; and a discharge arrester having first and second covering parts substantially covering the first and second surfaces of the sensor and facing toward the sheet feeding path and at least one projecting part extending from an end of at least one of the covering parts and projecting toward the sheet feeding path, the projecting part being aligned in a direction intersecting the sheet feeding direction and protecting the sensor against a discharge of static electricity from the sheet.

11. The sheet transport device of claim 10, wherein the projecting part extends from a downstream end of at least one of the covering parts of the arrester relative to the sheet feeding direction.

12. The sheet transport device of claim 10, wherein the at least one projecting part comprises first and second projecting parts extending respectively from the first and second covering parts of the arrester.

13. The sheet transport device of claim 12 further comprising a third element interconnecting said first and second elements of the sensor, the third element having a third surface facing the sheet feeding path, the arrester further having a third covering part substantially covering the third surface.

14. The sheet transport device of claim 13 further comprising a third projecting part extending from an end of the third covering part of the arrester and projecting toward the sheet feeding path, the third projecting part being aligned in a direction intersecting the sheet feeding direction along the sheet feeding path.

15. The sheet transport device of claim 10, wherein the third projecting part extends from a downstream end of the third covering part of the arrester relative to the sheet feeding direction.

* * * * *